May 27, 1924.
T. W. BARBER
1,495,765
EFFECTING THE RECOVERY OR SEPARATION OF COLLOIDAL MATTER FROM LIQUIDS
Filed June 29, 1920
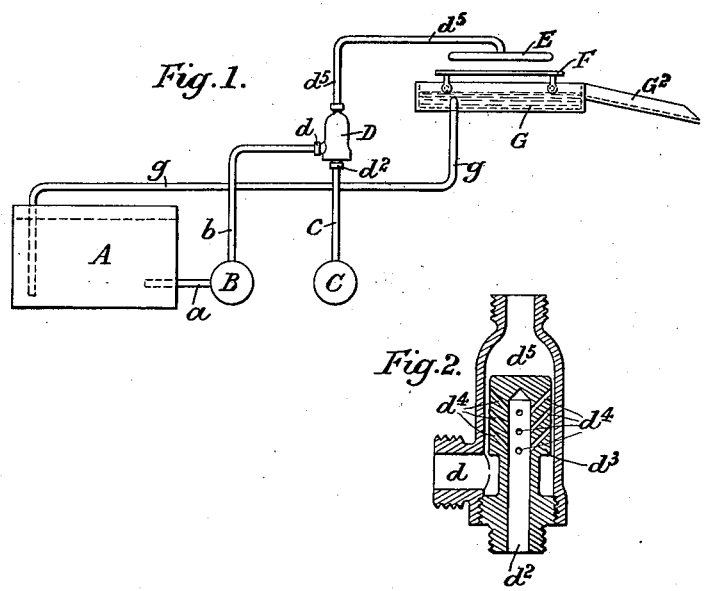
INVENTOR
THOMAS WALTER BARBER
BY Attorneys Patented May 27, 1924.

UNITED STATES PATENT OFFICE.

THOMAS WALTER BARBER, OF ANERLEY, LONDON, ENGLAND.

EFFECTING THE RECOVERY OR SEPARATION OF COLLOIDAL MATTER FROM LIQUIDS.

Application filed June 29, 1920. Serial No. 392,873.

(GRANTED UNDER THE PROVISIONS OF THE ACT OF MARCH 3, 1921, 41 STAT. L., 1313.)

*To all whom it may concern:*

Be it known that I, THOMAS WALTER BARBER, a subject of the King of Great Britain, residing at 15 Versailles Road, Anerley, in the county of London, England, have invented new and useful Improvements in Effecting the Recovery or Separation of Colloidal Matter from Liquids (for which I have filed application in England Dec. 2, 1918, Patent No. 132,947), of which the following is a specification.

This invention relates to the recovery, or separation, of colloidal matters from liquids.

Hitherto various methods have been proposed, or employed, for effecting the removal, or separation, of colloidal matter from liquids, such as filtration and precipitation, but these have not been found suitable, or satisfactory, for operations on a large, or manufacturing, scale, and have usually involved the use of chemicals which injuriously, or objectionably, affect the character of the precipitated matter, and further do not discriminate between colloidal matter on the one hand and, on the other hand, grosser matters held in suspension and finer matters held in solution.

My present invention provides a process, applicable for use on a large, or manufacturing, scale, by which colloidal matter can be removed from liquids in an economical and simple manner without the aid of chemicals and without filtration and also without other matters held in suspension, or solution, in the liquid being separated with the colloidal matter, and this I effect, substantially as hereinafter explained, by spraying, or projecting, the said liquid, or causing it to impinge, against an opposed surface, or opposed surfaces.

The liquor, containing the colloidal matter, and to be treated, should, preferably, be at, or be brought to, a low temperature, say one of from 60° to 70° Fahrenheit which has been found suitable. The said liquor can be delivered, preferably in this cool condition and under pressure, into a mixing jet, or the equivalent, in which it is brought into contact with atmospheric air, or other suitable gas, or mixture of gases, in such manner that absorption takes place and the liquor is highly charged, or surcharged, with the said air, or gas, or mixture of gases.

The liquid thus highly charged, or surcharged, is then sprayed, or otherwise ejected under pressure, and projected forcibly against a deflector surface, or against a series of deflector surfaces. The impinging of the said highly charged, or surcharged, liquid onto the said surface, or surfaces, causes the particles of colloidal matter to be subjected to such beating, or hammering, action that they combine, or cohere, to such an extent as to lose the colloidal nature which they possessed before treatment as aforesaid and they separate from the liquid either by sedimentation, or flotation, and can be collected in any convenient manner.

The beating, or hammering, action is accentuated by the presence, in the liquid, of the air, or gas, or mixture of gases, under pressure and the subsequent separation of the converted colloidal matter from the liquid is facilitated by the disturbing action of the air, or gas, or mixture of gases, as it leaves the highly charged, or surcharged, liquor.

I do not limit myself to the use of any particular arrangement, or construction, of apparatus in carrying out the process according to my invention, but I have illustrated, diagrammatically, in the accompanying drawing, a suitable arrangement, or construction, which may be employed for the purpose.

Figure 1 is an elevation, shewing, diagrammatically, the general arrangement. Figure 2 is a longitudinal section of a jet, or nozzle, which I can employ, although, as before stated, I do not limit myself thereto.

A is a tank into which the liquid, containing colloidal matter, and to be treated in accordance with my invention, is run. This tank A, is connected, by the pipe $a$, with a pump B, which draws the said liquid from the tank A, and passes it by the pipe $b$, into the body-part of a jet D, the said pipe $b$, being connected to the inlet branch $d$, of the jet (see Figure 2). Atmospheric air, or other suitable gas, or mixture of gases, is passed, by the pipe $c$, from a pump C, into the inlet $d^2$, for air, or gas, or gases, to the internal nozzle $d^3$, of the jet, from which the air, or gas, or gases, will pass under pressure through the perforations $d^4$, into the space $d^5$, in the body of the jet where it meets the liquid which enters the said space $d^5$, from the pipe $b$, so that the said liquid is therein highly charged, or surcharged, with the said air, or gas, or gases, the said liquid, so highly charged, or surcharged, passing, by the pipe $d^5$, to a sprayer E, from which the said highly charged, or surcharged, liquor is projected onto a plate F, with the effect of causing the colloidal particles to cohere, or combine, as aforesaid, the said particles in the liquor, in conjunction with the air, or gas, or gases, passing into a separating trough G from which cohering, or combined, particles, of colloidal matter will pass off by a spout $G^2$, or may be collected in any other convenient manner, whilst the liquid returns, by the pipe $g$, to the tank A for retreatment if necessary.

The collected colloidal matter may be treated for purification in any convenient way if so desired.

What I claim is:—

1. In a process for collecting colloidal matter, the step which comprises impinging a liquid containing the colloidal matter against an opposed surface to cause the colloidal particles to cohere.

2. In a process for removing colloidal matter from liquid containing it, the steps which comprise impinging said liquid against an opposed surface to cause the colloidal particles to cohere, and then separating the coherent colloidal matter from the liquid.

3. In a process for collecting colloidal matter in a liquid containing it, the step which comprises charging the liquid with suitable gas and impinging said liquid against an opposed surface to cause the colloidal particles to cohere.

4. In a process for removing colloidal matter from liquid containing it, the step which comprises cooling the said liquid, and impinging it against an opposed surface to cause the colloidal particles to cohere, and thereafter recovering the coherent colloidal matter.

5. A process of collecting colloidal matter in a liquid containing it, which comprises cooling the said liquid, charging it with suitable gas, and impinging the cooled and gas-charged liquid against an opposed surface to cause the colloidal particles to cohere.

6. A process of collecting colloidal matter in a liquid containing it, which comprises mingling gas under pressure with said liquid and impinging the liquid so charged, and while cool, against an opposed surface to cause the colloidal particles to cohere.

In testimony whereof I have signed my name to this specification in the presence of two subscribing witnesses.

THOMAS WALTER BARBER.

Witnesses:
ALBERT JAMES VINTON,
JAMES CROWTHER.